United States Patent
Cronin et al.

(10) Patent No.: US 9,591,336 B2
(45) Date of Patent: Mar. 7, 2017

(54) CAMERA FEED DISTRIBUTION FROM EVENT VENUE VIRTUAL SEAT CAMERAS

(71) Applicant: ProSports Technologies, LLC, Miami, FL (US)

(72) Inventors: John Cronin, Bonita Springs, FL (US); Nick Reasner, Miami, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,286

(22) Filed: Jul. 13, 2015

(65) Prior Publication Data
US 2016/0014435 A1    Jan. 14, 2016

Related U.S. Application Data

(60) Provisional application No. 62/023,807, filed on Jul. 11, 2014, provisional application No. 62/029,601, filed on Jul. 28, 2014.

(51) Int. Cl.
*H04N 21/218* (2011.01)
*H04N 21/235* (2011.01)
(Continued)

(52) U.S. Cl.
CPC ....... *H04N 21/21805* (2013.01); *H04N 5/232* (2013.01); *H04N 5/247* (2013.01);
(Continued)

(58) Field of Classification Search
None
See application file for complete search history.

(56) References Cited

U.S. PATENT DOCUMENTS 6,080,063 A    6/2000  Khosla
6,144,375 A *  11/2000 Jain .................. G06F 17/30017
                                                      345/420
(Continued)

FOREIGN PATENT DOCUMENTS

CN    102843186    12/2012
EP    2 150 057    12/2013
(Continued)

OTHER PUBLICATIONS

"Anvato Announces New Cloud Solution for HD Live Streaming, Clip Editing, Social Sharing and Archival", ANVATO KNOWS/Video, May 12, 2014.
(Continued)

*Primary Examiner* — Brian T Pendleton
*Assistant Examiner* — Jean D Saint Cyr
(74) *Attorney, Agent, or Firm* — Polsinelli LLP

(57) ABSTRACT

Event venues may be set up to include multiple cameras, each camera providing a video feed providing a view from a different location in an eventgoer seating area of the event venue. The cameras may all feed into a central event venue controller system, which may then interact with mobile devices of users requesting streaming video feeds of an event taking place in the event venue. The event venue controller system can then provide the multiple video feeds from the variety of locations to the requesting mobile devices. The event venue controller system can also automatically intelligently pick out the best video feeds based on distance to specific event occurrences, camera angles, and types of event occurrences. The event venue controller system may charge the mobile devices for providing the video feeds and for picking out the best video feeds.

18 Claims, 11 Drawing Sheets

(51) Int. Cl.

| | |
|---|---|
| *H04N 21/414* | (2011.01) |
| *H04N 21/422* | (2011.01) |
| *H04N 21/442* | (2011.01) |
| *H04N 5/247* | (2006.01) |
| *H04N 21/214* | (2011.01) |
| *H04N 21/2187* | (2011.01) |
| *H04N 21/239* | (2011.01) |
| *H04N 21/2543* | (2011.01) |
| *H04N 21/472* | (2011.01) |
| *H04N 5/232* | (2006.01) |

(52) U.S. Cl.
CPC ..... *H04N 21/2143* (2013.01); *H04N 21/2187* (2013.01); *H04N 21/2393* (2013.01); *H04N 21/2543* (2013.01); *H04N 21/47202* (2013.01); *H04N 21/41407* (2013.01)

(56) References Cited

U.S. PATENT DOCUMENTS

| | | |
|---|---|---|
| 6,204,813 B1 | 3/2001 | Wadell et al. |
| 6,952,558 B2 | 10/2005 | Hardacker |
| 7,079,176 B1 | 7/2006 | Freeman et al. |
| 7,091,863 B2 | 8/2006 | Ravet |
| 7,136,042 B2 | 11/2006 | Magendanz et al. |
| 7,383,229 B2 | 6/2008 | Jacoby |
| 7,583,901 B2 | 9/2009 | Nakagawa et al. |
| 7,620,426 B2 | 11/2009 | Ortiz et al. |
| 7,715,723 B2 | 5/2010 | Kagawa et al. |
| 7,721,339 B2 | 5/2010 | Madison et al. |
| 7,734,730 B2 | 6/2010 | McCanne |
| 7,743,070 B1 | 6/2010 | Blumberg |
| 7,849,160 B2 | 12/2010 | Hayward |
| 7,884,855 B2 | 2/2011 | Ortiz |
| 8,019,227 B2 | 9/2011 | Iizuka |
| 8,042,140 B2 | 10/2011 | Thomas et al. |
| 8,091,111 B2 | 1/2012 | Logan et al. |
| 8,237,787 B2 | 8/2012 | Hollinger |
| 8,279,051 B2 | 10/2012 | Khan |
| 8,333,321 B2 | 12/2012 | Gressel et al. |
| 8,391,773 B2 | 3/2013 | Arseneau et al. |
| 8,408,553 B2 | 4/2013 | Eskildsen |
| 8,482,612 B2 | 7/2013 | Tamir et al. |
| 8,526,931 B1 | 9/2013 | Fraley |
| 8,538,276 B2 | 9/2013 | Shimada et al. |
| 8,588,432 B1 | 11/2013 | Simon |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,622,832 B2 | 1/2014 | Marty et al. |
| 8,626,465 B2 | 1/2014 | Moore et al. |
| 8,630,216 B2 | 1/2014 | Deivasigamani et al. |
| 8,638,367 B1 | 1/2014 | Allen |
| 8,660,501 B2 | 2/2014 | Sanguinetti |
| 8,706,044 B2 | 4/2014 | Chang et al. |
| 8,724,723 B2 | 5/2014 | Panicker et al. |
| 8,736,681 B2 | 5/2014 | Matsuzawa |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,124,729 B2 | 9/2015 | Jung et al. |
| 9,498,678 B2 | 11/2016 | Cronin |
| 2002/0132612 A1 | 9/2002 | Ishii |
| 2002/0156835 A1 | 10/2002 | Williams et al. |
| 2003/0023595 A1 | 1/2003 | Carbom et al. |
| 2004/0071209 A1 | 4/2004 | Burg et al. |
| 2004/0086257 A1 | 5/2004 | Werberig et al. |
| 2004/0171381 A1 | 9/2004 | Inselberg |
| 2005/0012023 A1 | 1/2005 | Vock et al. |
| 2005/0027608 A1 | 2/2005 | Wiesmuller et al. |
| 2005/0093976 A1 | 5/2005 | Valleriano et al. |
| 2005/0202905 A1 | 9/2005 | Chesser |
| 2005/0259618 A1 | 11/2005 | Ahya et al. |
| 2005/0273830 A1* | 12/2005 | Silver ................. H04N 5/4401 725/105 |
| 2006/0067654 A1 | 3/2006 | Herberger et al. |
| 2007/0188611 A1 | 8/2007 | Carter |
| 2007/0188612 A1 | 8/2007 | Carter |
| 2007/0200929 A1 | 8/2007 | Conaway |
| 2008/0137507 A1 | 6/2008 | Sun et al. |
| 2008/0140233 A1 | 6/2008 | Seacat |
| 2008/0192116 A1 | 8/2008 | Tamir et al. |
| 2009/0061971 A1 | 3/2009 | Weitzner et al. |
| 2009/0082110 A1 | 3/2009 | Relyea et al. |
| 2009/0171571 A1 | 7/2009 | Son et al. |
| 2010/0026809 A1* | 2/2010 | Curry .................... H04N 5/222 348/157 |
| 2010/0043040 A1 | 2/2010 | Olsen |
| 2010/0245588 A1* | 9/2010 | Waehner ............... G01S 3/781 348/169 |
| 2010/0306064 A1 | 12/2010 | Inselberg |
| 2011/0014974 A1 | 1/2011 | Torf |
| 2011/0050904 A1 | 3/2011 | Anderson |
| 2011/0125809 A1 | 5/2011 | Woods et al. |
| 2011/0165946 A1 | 7/2011 | Pavlich et al. |
| 2011/0202945 A1 | 8/2011 | Pickelsimer et al. |
| 2011/0280540 A1 | 11/2011 | Woodman |
| 2011/0304737 A1 | 12/2011 | Evans et al. |
| 2012/0052949 A1 | 3/2012 | Weitzner et al. |
| 2012/0054178 A1 | 3/2012 | Tran et al. |
| 2012/0188345 A1 | 7/2012 | Salow |
| 2012/0229338 A2 | 9/2012 | Eidloth et al. |
| 2012/0296826 A1 | 11/2012 | Bergdale et al. |
| 2012/0317302 A1 | 12/2012 | Silvestri et al. |
| 2013/0126713 A1 | 5/2013 | Haas et al. |
| 2013/0141555 A1 | 6/2013 | Ganick et al. |
| 2013/0160051 A1 | 6/2013 | Armstrong et al. |
| 2013/0182117 A1 | 7/2013 | Arseneau et al. |
| 2013/0196788 A1 | 8/2013 | Shimizu et al. |
| 2013/0205341 A1 | 8/2013 | Jabara et al. |
| 2013/0268620 A1 | 10/2013 | Osminer |
| 2013/0279917 A1 | 10/2013 | Son et al. |
| 2013/0283305 A1 | 10/2013 | Hirsch et al. |
| 2013/0286212 A1 | 10/2013 | Sandler et al. |
| 2013/0300821 A1 | 11/2013 | Lankford et al. |
| 2013/0300832 A1 | 11/2013 | Hohteri et al. |
| 2013/0303192 A1 | 11/2013 | Louboutin |
| 2013/0305297 A1 | 11/2013 | Jabara et al. |
| 2013/0317835 A1 | 11/2013 | Mathew |
| 2013/0328771 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335520 A1 | 12/2013 | Campbell et al. |
| 2013/0336662 A1 | 12/2013 | Murayama et al. |
| 2013/0343762 A1 | 12/2013 | Murayama et al. |
| 2014/0031058 A1 | 1/2014 | Zhang et al. |
| 2014/0057658 A1 | 2/2014 | Murad et al. |
| 2014/0062773 A1 | 3/2014 | MacGougan |
| 2014/0063259 A1 | 3/2014 | Rhodes et al. |
| 2014/0065962 A1 | 3/2014 | Le |
| 2014/0071221 A1 | 3/2014 | Dave |
| 2014/0072270 A1* | 3/2014 | Goldberg ............... H04N 9/87 386/223 |
| 2014/0105084 A1 | 4/2014 | Chhabra |
| 2014/0111625 A1 | 4/2014 | Dawe et al. |
| 2014/0139380 A1 | 5/2014 | Ouyang |
| 2014/0141803 A1 | 5/2014 | Marti |
| 2014/0150042 A1 | 5/2014 | Pacor et al. |
| 2014/0161416 A1 | 6/2014 | Chou et al. |
| 2014/0162628 A1 | 6/2014 | Bevelacqua |

(56) References Cited

U.S. PATENT DOCUMENTS

| | | | |
|---|---|---|---|
| 2014/0164520 A1 | 6/2014 | Fan | |
| 2014/0164760 A1* | 6/2014 | Hybertson | H04N 21/4402 713/153 |
| 2014/0167794 A1 | 6/2014 | Nath | |
| 2014/0168170 A1 | 6/2014 | Lazarescu | |
| 2014/0171039 A1 | 6/2014 | Bjontegard | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0195675 A1 | 7/2014 | Silver et al. | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0241730 A1 | 8/2014 | Jovicic et al. | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0349750 A1 | 11/2014 | Thompson et al. | |
| 2014/0363168 A1 | 12/2014 | Walker | |
| 2014/0364089 A1 | 12/2014 | Lienhart | |
| 2014/0364148 A1 | 12/2014 | Block | |
| 2014/0365120 A1 | 12/2014 | Vulcano | |
| 2014/0375217 A1 | 12/2014 | Feri et al. | |
| 2015/0006648 A1 | 1/2015 | Cao | |
| 2015/0011242 A1 | 1/2015 | Nagaraj | |
| 2015/0026623 A1 | 1/2015 | Horne | |
| 2015/0031397 A1 | 1/2015 | Jouaux | |
| 2015/0058781 A1 | 2/2015 | Malik et al. | |
| 2015/0131845 A1 | 5/2015 | Forouhar et al. | |
| 2015/0189349 A1 | 7/2015 | Nelson | |
| 2015/0326902 A1 | 11/2015 | Levakov et al. | |
| 2016/0008662 A1 | 1/2016 | Cronin | |
| 2016/0014481 A1 | 1/2016 | Cronin | |
| 2016/0062722 A1 | 3/2016 | Cronin | |
| 2016/0066159 A1 | 3/2016 | Cronin | |

FOREIGN PATENT DOCUMENTS

| | | |
|---|---|---|
| WO | WO 01/41884 | 6/2001 |
| WO | WO 2004/071598 | 8/2004 |
| WO | WO 2007/035878 A2 | 3/2007 |
| WO | WO 2007/035878 A3 | 3/2007 |
| WO | WO 2009/104921 | 8/2009 |
| WO | WO 2011/137100 | 11/2011 |
| WO | WO 2013/121215 | 8/2013 |
| WO | WO 2016/007962 | 1/2016 |
| WO | WO 2016/007965 | 1/2016 |
| WO | WO 2016/007967 | 1/2016 |
| WO | WO 2016/033366 | 3/2016 |
| WO | WO 2016/036571 | 3/2016 |

OTHER PUBLICATIONS

"Aspera To Showcase Digital Media Workflow And Broadcast IT Solutions At Broadcastasia 2013", Aspera News, Jun. 4, 2013.
Barney et al., Casey; "Visible Light Communication Systems", A Major Qualifying Project Report Submitted to the Faculty of the Worchester Polytechnic Institute, Mar. 28, 2014.
"Bright Leverages Cloud To Stream Sports Content Worldwide", by Sports Video Group, Jul. 9, 2013.
"Casio Unveils Prototype of Visible Light Communication System Using Smartphones at CES", Casio Computer Co., Ltd., Jan. 10, 2012.
"Camera Corps Robotic Cameras Systems to Televise Wimbledon Action", TVTechnology, Jun. 24, 2013. http://www.tvtechnology.com/equipment/0082/camera-corps-ro . . . .
"Cisco Stadium Vision Mobile", Cisco, May 21, 2014.
Coxworth, Ben; "NFL may track footballs using magnetic fields", Gizmag.com, Jun. 13, 2014 http://www.gizmag.com/football-tracking-magnetic-fields/3254 . . . .
"Create Innovative SERVICES with PLAY APPS", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Davies, Chris; "Philips LED lights flicker out a challenge to iBeacon and Gimbal", SlashGear, Feb. 17, 2014.
Dawson, Keith; "LiFi in the Real World" All LED Lighting—Illuminating The LED Community, Jul. 31, 2013.
Dinh et al., Thang; "Real time tracking using an active pan-tilt-zoom network camera", Proceeding IROS '09 Proceedings of the 2009 IEEE/RSJ International conference on Intelligent robots and systems. pp. 3786-3793, 2009.
"Engaged Sports Media Selects thePlatform as Centralized Cloud-based Video Publishing System", thePlatform, Oct. 31, 2013.
"EZ Display and EZ Remote for Android—User Guide", InFocus, Jul. 10, 2013.
Fisher et al., Brian E.; "Measurements corner: Three-dimensional position and orientation measurements using magneto-quasistatic fields and complex image theory", IEEE Xplore Abstract, Antennas and Propagation Magazines, IEEE (vol. 56, Iss. 1) Feb. 2014, pp. 160-173.
"Football camera provides ball's-eye view of the field", R&D Magazine Webcast, Feb. 27, 2013.
Gaddam et al., Vamsidhar R.; "Interactive Zoom and Panning from Live Panoramic Video", Nossdav '14 Proceedings of Network and Operating Systems Support for Digital Audio and Video Workshop, Mar. 19, 2014.
Gerhardt, Ryan; "Stadium App Lets Fans Order Food and Get On-Court Close Ups", PSFK.com, Feb. 22, 2013.
"GigaBroadcasting", Li-Fi Consortium, Date of Download: Aug. 14, 2014.
Gilpin, Lyndsey; "How GE created smart lights by integrating beacons into LEDs", TechRepublic, Jun. 6, 2014.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hammond, Teena; "Stadiums race to digitize: How sports teams are scrambling to keep Millenials coming to games", TechRepublic. Apr. 12, 2014.
"Hybrid's Sport Track Enables Robotic Cameras to Follow Action", TVTechnology, May 29, 2013 http://www.tvtechnology.com/news/0086/hybrids-sport-track-en.
Jaffe, Jay; "MLB unveils revolutionary next-level tracking technology on defense", The Strike Zone, Mar. 3, 2014.
Kamenetzky, Andy; "Inside The Most Connected Sports Venue In America (And, No, It Ain't Cowboys Stadium)", Digital Trends, Nov. 6, 2013.
Kaplan, Daniel; "In-game locker room video still rare around NFL", SportsBusiness Journal, Sep. 30, 2013.
Kappeler et al., Uwe-Philipp; "3D Object Localizationi via Stereo Vision using an Omnidirectional and a Perspective Camera", Proceedings of the 2nd. Workshop on Omnidirectional Robot Vision. May 7, 2010. ISBN 978-88-95872-02-5 pp. 7-12.
Keith Price Bibliography Sports, Line Judge, Ball Position, Ball Tracking and Enhanced Displays, VisionBib. Date of download: Apr. 24, 2014 http://www.visionbib.com/bibliography/motion-f746ba1.html.
Kumar, Navin; "Visible Light Communications Systems Conception and VIDAS", IETE Technical Review, vol. 25, Issue 6, Nov.-Dec. 2008. Date of download: Nov. 19, 2009.
Lavars, Nick; "Adidas miCoach Smart Ball tracks your striking power and finesse", Gizmag.com, May 28, 2014 http://www.gizmag.com/adidas-micoach-smart-soccer-ball/3228 . . . .

(56) References Cited

OTHER PUBLICATIONS

LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
"Manchester City's Etihad Stadium is soon to be transformed into the Premier League's most technologically fan-friendly stadium", Machester City, May 8, 2013.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consortium (VLCC), Apr. 26, 2012.
Pawate et al., Raj; "Remote display technology enhances the cloud's user experience", Texas Instruments, Aug. 2012.
Pingali et al., Gopal' "Lucentivision: Converting Real World Events Into Multimedia Experiences", Multimedia and Expo, 2000. ICME 2000. 2000 IEEE International Conference on vol. 3, Jul. 30, 2000-Aug. 2, 2000.
Povey, Gordon, "VLC for Location, positioning and navigation", Jul. 27, 2011, http://visiblelightcomm.com/vlc-for-location-positioning-and-n . . . .
"Proprietary Data Is Foundational", Contextual Database| Delivery Agent, Inc. Date of Download: Apr. 30, 2014 http://www.deliveryagent.com/products/contextual-database/.
RedFIR Precision Real-Time Tracking, Fraunhofer Institute for Integrated Circuits IIS. Oct. 7, 2015.
Ren et al., Jinchang; "A General Framework For 3D Soccer Ball Estimation and Tracking", Image Processing, 2004. ICIP '04. 2004 International Conference on (vol. 3) Date of Conference: Oct. 24-27, 2004.
Rufo et al., J.; "Visible Light Communication Systems For Optical Video Transmission", Microwave and Optical Technology Letters, vol. 52, No. 7, Jul. 2010.
"Streaming Video Online Databases", MLibrary, University of Michigan. Maintained by: Clara Slavens, last modified: Apr. 17, 2014.
"Surveillance Monitoring—Networking Security—PTZ Network Cameras", Panasonic USA. http://www.panasonic.com/business/psna/products-surveillance-monitoring/network-security-cameras/ptz-cameras.aspx Date of Download: Apr. 29, 2014.
Swedberg, Claire; "RFID Helps Soccer Teams Keep Their Eye On the Ball, and Their Players", RFID Journal, Mar. 13, 2012.
Thanigavel, M.; "Li-Fi Technology in Wireless Communication", International Journal of Engineering Research & Technology (IJERT), ISSN: 2278-0181, vol. 2 Issue 10, Oct. 2013.
Wells, Alton; "How would you build a gimball system that could track any point within a 360 degree "sphere"", AskEngineers. Posted on Aug. 26, 2013.
Wiedeman, Reeves; "Sporting Kansas City Makes the Stadium More Like Your Couch", BloombergBusinessweek, Jul. 18, 2013.
Woodward, Alexander; Delmas, Patrice; "Computer Vision for Low Cost 3-D Golf Ball and Club Tracking", CITR, University of Auckland, Dept. Computer Science, New Zealand.Date of Download: Apr. 29, 2014.
Won, Eun Tae; "Visible Light Communication: Tutorial", Project: IEEE P802.15 Working Group for Wireless Personal Area Networks (WPANs), Mar. 9, 2008.
"World Cup 2014: Goalline technology TV process reviewed", BBC Sport, Jun. 16, 2014. http://www.bbc.com/sport/0/football/27864393.

Fei; "Tennis Ball Tracking for Automatic Annotation of Broadcast Tennis Video", Centre for Vision, Speech and Signal Processing, School of Electronics and Physical Sciences, Jun. 2007.
Yu, Shuang; "Automatic Basketball Tracking in Broadcast Basketball Video", A Thesis submitted in partial fulfillment of the requirements for the Degree of Master of Science in the Faculty of Graduate Studies. Aug. 2012.
PCT Application No. PCT/US2015/033613 International Search Report and Written Opinion mailed Sep. 1, 2015.
PCT Application No. PCT/US2015/040207 International Search Report and Written Opinion mailed Oct. 5, 2015.
PCT Application No. PCT/US2015/040215 International Search Report and Written Opinion mailed Sep. 29, 2015.
PCT Application No. PCT/US2015/040223 International Search Report and Written Opinion mailed Oct. 1, 2015.
U.S. Appl. No. 14/798,271 Office Action mailed Nov. 2, 2015.
U.S. Appl. No. 14/788,748 Office Action mailed Nov. 5, 2015.
U.S. Appl. No. 14/798,294 Office Action mailed Nov. 2, 2015.
U.S. Appl. No. 14/838,129 Office Action mailed Oct. 29, 2015.
PCT Application No. PCT/US2015/047148 International Search Report and Written Opinion mailed Dec. 17, 2015.
U.S. Appl. No. 14/798,271 Final Office Action mailed May 5, 2016.
U.S. Appl. No. 14/798,296 Office Action mailed Apr. 5, 2016.
U.S. Appl. No. 14/837,457 Office Action mailed Feb. 16, 2016.
U.S. Appl. No. 14/838,767 Office Action mailed Feb. 16, 2016.
U.S. Appl. No. 14/829,184 Final Office Action mailed Mar. 21, 2016.
U.S. Appl. No. 14/798,346 Office Action mailed Dec. 18, 2015.
PCT Application No. PCT/US2015/047265 International Search Report and Written Opinion mailed Dec. 7, 2015.
U.S. Appl. No. 14/829,184 Office Action mailed Nov. 23, 2015.
U.S. Appl. No. 14/788,748 Final Office Action mailed May 26, 2016.
U.S. Appl. No. 14/798,346 Final Office Action mailed Jun. 30, 2016.
U.S. Appl. No. 14/798,294 Final Office Action mailed May 13, 2016.
U.S. Appl. No. 14/838,129 Final Office Action mailed Jun. 10, 2016.
U.S. Appl. No. 14/798,314, John E. Cronin, Ball Tracker Camera, filed Jul. 13, 2015.
PCT/US15/40215, Ball Tracker Camera, filed Jul. 13, 2015.
U.S. Appl. No. 14/798,271, John Cronin, Event-Based Content Collection for Network-Based Distribution, filed Jul. 13, 2015.
PCT/US15/40207, Camera Feed Distribution From Event Venue Virtual Seat Cameras, filed Jul. 13, 2015.
U.S. Appl. No. 14/788,748, John Cronin, Sports Television Applications, filed Jun. 30, 2015.
U.S. Appl. No. 14/798,346, John Cronin, Ball Tracker Snippets, filed Jul. 13, 2015.
PCT/US15/40223, Ball Tracker Snippets, filed Jul. 13, 2015.
U.S. Appl. No. 14/798,294, John Cronin, Event Data Transmission to Eventgoer Devices, filed Jul. 13, 2015.
U.S. Appl. No. 14/798,296, John Cronin, Event and Fantasy League Data Transmission to Eventgoer Devices, filed Jul. 13, 2015.
U.S. Appl. No. 14/837,457, John E. Cronin, Multiple Display Controller System, filed Aug. 27, 2015.
PCT/US 15/47148, Multiple Display Controller System, filed Aug. 2015.
U.S. Appl. No. 14/838,767, John E. Cronin, Automated Clip Creation, filed Aug. 2015.
U.S. Appl. No. 14/829,184, Maxx T. Garrison, Event Media, filed Aug. 18, 2015.
U.S. Appl. No. 14/838,129, John E. Cronin, Current Event and Outside Event Data Transmission to Eventgoer Devices, filed Aug. 27, 2015.
PCT/US15/47265, Current Event and Outside Event Data Transmission to Eventgoer Devices, filed Aug. 27, 2015.
U.S. Appl. No. 14/798,296 Final Office Action mailed Sep. 13, 2016.
U.S. Appl. No. 14/837,457 Final Office Action mailed Aug. 23, 2016.
U.S. Appl. No. 14/838,767 Final Office Action mailed Aug. 25, 2016.
U.S. Appl. No. 14/829,184 Office Action mailed Sep. 12, 2016.
U.S. Appl. No. 14/798,294 Office Action mailed Oct. 4, 2016.

* cited by examiner

Beam
FIG. 2A
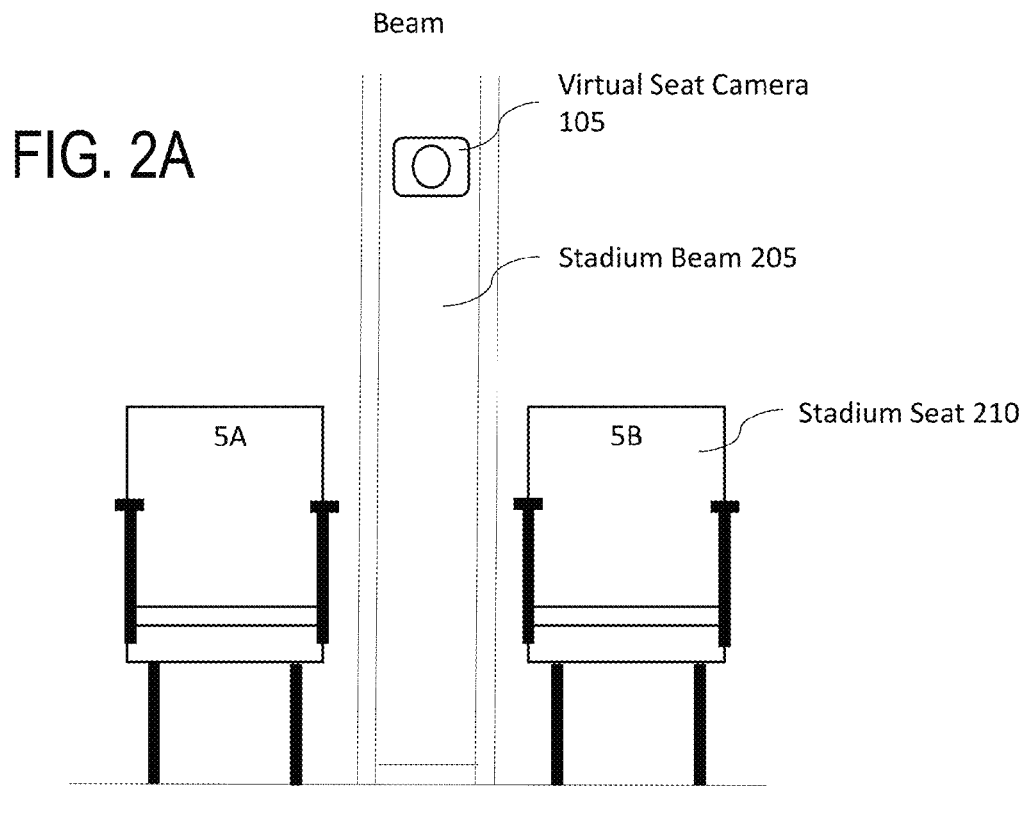
Seat
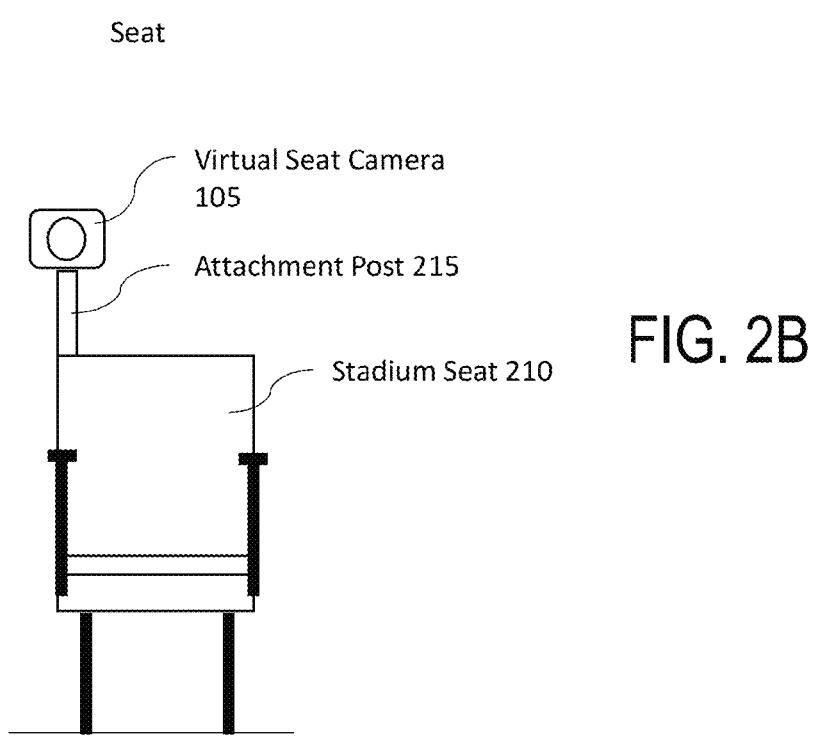
FIG. 2B

Stadium Controller Camera Database 160

| ID | Facing | Coordinate (x:y) |
|---|---|---|
| c1 | South | 0:100 |
| c2 | South | 5:100 |
| c3 | South | 10:100 |
| ⇨ | ⇨ | ⇨ |
| c28 | West | 0:5 |

FIG. 7

CAMERA FEED DISTRIBUTION FROM EVENT VENUE VIRTUAL SEAT CAMERAS

CROSS-REFERENCE TO RELATED APPLICATIONS

The present application claims the priority benefit of U.S. provisional application No. 62/023,807 filed Jul. 11, 2014 entitled "Virtual Seat Viewer For Sporting Events," as well as U.S. provisional application No. 62/029,601 filed Jul. 28, 2014 entitled "Virtual Seat Viewer With Suggested Action Camera," the disclosures of which are hereby incorporated by reference.

BACKGROUND

Field of Invention

The present invention generally relates to camera feed recording, selection, and distribution. More specifically, the present invention relates to recording camera feeds from multiple cameras in an event venue, selecting the camera feeds that best capture an event occurrence to recommend, and distributing selected camera feeds to authorized user devices.

Description of the Related Art

Larger events, such as concerts or sporting events, are typically held in larger event venues, such as stadiums. Typically, event venues include a performance area, such as a sport field, or a sport arena, or a sport court, or a concert stage, or a lecture stage. Typically, event venues include an eventgoer area, such as stadium seating, bleachers, theater seating, or a standing room eventgoer area. Typically, some parts of the eventgoer area provide better views or better acoustics of parts of events occurring within the performance area than other parts of the eventgoer area.

Cameras are sometimes used to film events occurring at event venues, typically to prepare for live or recorded television transmission. Such cameras are often located in the performance area, and typically data from such cameras is not provided digitally to users within the event venue or outside of it.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Digital payments may typically be accepted through the use of images of personal or cashier's checks, through transmission of credit card information such as credit card numbers and associated expiration dates or names or security numbers/codes, or through electronic payment services that allow money to be transferred from a payer's bank account or from a separate digital wallet account.

Thus, a means of camera feed distribution is needed.

SUMMARY OF THE CLAIMED INVENTION

One exemplary method for camera feed distribution includes receiving a plurality of live camera feeds associated with a plurality of cameras located in an eventgoer area of an event venue, each camera feed of the plurality of camera feeds associated with one camera of the plurality of cameras. The method also includes receiving a request from a mobile device to view an event taking place in the event venue. The method also includes providing a feed listing to the mobile device, the camera listing identifying at least a subset of the plurality of cameras feeds. The method also includes receiving a selection from the mobile device, the selection identifying a first camera feed from the feed listing. The method also includes streaming video data from the first camera feed to a video playing interface stored in a memory of the mobile device and executed by a processor of the mobile device.

One exemplary system for camera feed distribution includes a plurality of cameras located in an eventgoer area of an event venue as well as a event venue controller. Execution of instructions stored in a memory of the event venue controller by a processor of the event venue controller performs various system operations. The system operations include receiving a plurality of live camera feeds associated with the plurality of cameras, each camera feed of the plurality of camera feeds associated with one camera of the plurality of cameras. The system operations also include receiving a request from a mobile device to view an event taking place in the event venue. The system operations also include providing a feed listing to the mobile device, the camera listing identifying at least a subset of the plurality of cameras feeds. The system operations also include receiving a selection from the mobile device, the selection identifying a first camera feed from the feed listing. The system operations also include streaming video data from the first camera feed to a video playing interface stored in a memory of the mobile device and executed by a processor of the mobile device.

One exemplary non-transitory computer-readable storage medium is also described, the non-transitory computer-readable storage medium having embodied thereon a program executable by a processor to perform an exemplary program method for camera feed distribution that includes receiving a plurality of live camera feeds associated with a plurality of cameras located in an eventgoer area of an event venue, each camera feed of the plurality of camera feeds associated with one camera of the plurality of cameras. The program method also includes receiving a request from a mobile device to view an event taking place in the event venue. The program method also includes providing a feed listing to the mobile device, the camera listing identifying at least a subset of the plurality of cameras feeds. The program method also includes receiving a selection from the mobile device, the selection identifying a first camera feed from the feed listing. The program method also includes streaming video data from the first camera feed to a video playing interface stored in a memory of the mobile device and executed by a processor of the mobile device.

BRIEF DESCRIPTION OF THE DRAWINGS

FIG. 2A illustrates an exemplary virtual seat camera coupled to a beam.

FIG. 2B illustrates an exemplary virtual seat camera coupled to a seat.

FIG. 7 illustrates an exemplary stadium controller camera database.

DETAILED DESCRIPTION

Event venues may be set up to include multiple cameras, each camera providing a video feed providing a view from a different location in an eventgoer seating area of the event venue. The cameras may all feed into a central event venue controller system, which may then interact with mobile devices of users requesting streaming video feeds of an event taking place in the event venue. The event venue controller system can then provide the multiple video feeds from the variety of locations to the requesting mobile devices. The event venue controller system can also automatically intelligently pick out the best video feeds based on distance to specific event occurrences, camera angles, and types of event occurrences. The event venue controller system may charge the mobile devices for providing the video feeds and for picking out the best video feeds.

Figure 1:
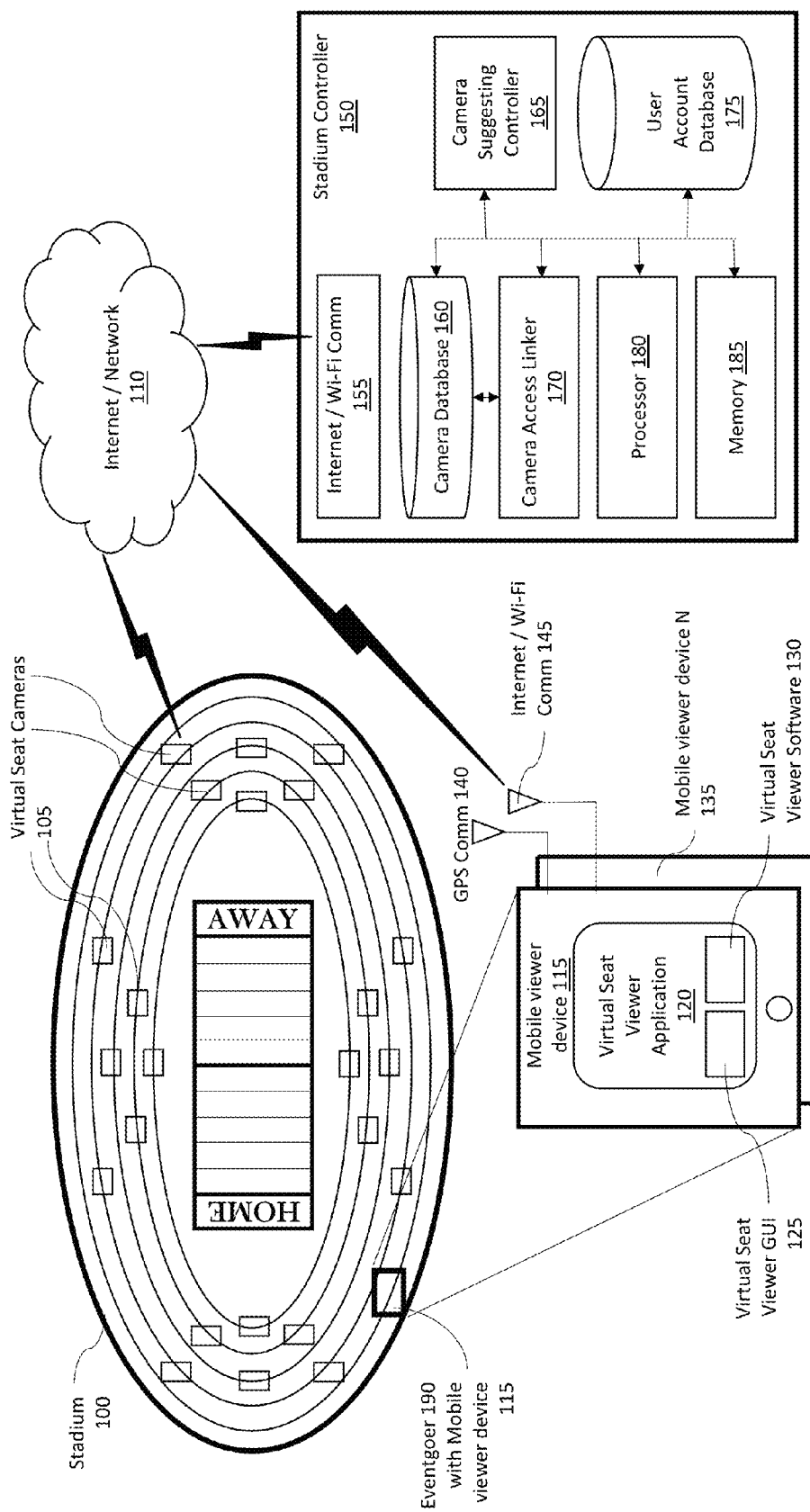
FIG. 1 illustrates an exemplary event venue ecosystem.

FIG. 1 illustrates an exemplary event venue ecosystem.

The event venue is illustrated in FIG. 1 as a sport stadium 100, but may be any type of event venue used to host any type of event, public or private. For instance, the event venue may be a venue for any type of entertainment or cultural events that are presented at a theater, gymnasium, church, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

The stadium 100 of FIG. 1 may include one or more virtual seat cameras 105. These may be video or image cameras that may record a camera feed, which may consist of a stream of video data (e.g., real-time live video or image data, or semi-live video or image data with a predetermined delay). The camera feed may point toward a performance area of the event venue (e.g., the play field of a sports stadium) in order to simulate a view that an audience member might have from a particular seat or in a particular seating area. These virtual seat cameras 105 may be distributed throughout an event venue seating area in a number of ways, as exemplified in FIG. 2A, FIG. 2B, and FIG. 2C. The camera feed may alternately or additionally include an audio feed from a microphone coupled to or included within the virtual seat cameras 105.

A camera feed recorded by one or more of the virtual seat cameras 105 may then be transmitted to a stadium controller 150, whereupon it may be transmitted from the stadium controller 150 on to one or more mobile viewer devices 115 (e.g., which may be held by an eventgoer 190 within the event venue 100 or by a user outside the event venue 100). Alternately, a camera feed recorded by one or more of the virtual seat cameras 105 may be transmitted directly from the virtual seat cameras 105 to the one or more mobile viewer devices 115 (e.g., which may be held by an eventgoer 190 within the event venue 100 or by a user outside the event venue 100) without first passing through the stadium controller 150. Any of these transmissions of the camera feed data may be performed in a wired or wireless manner, and may be direct transmissions (e.g., via universal serial bus or Bluetooth), transmissions passing through a private network (e.g., transmissions passing through a local area network or a wireless local area network), or transmissions passing through the public Internet.

The virtual seat cameras 105 may each include a communication module (not shown) capable at least of transmission of the camera feed to the stadium controller 150 and/or to mobile viewer devices 115. Similarly, the stadium controller 150 may include an internet/network communication module 155 capable at least of receipt of one or more camera feeds from one or more virtual seat cameras 105 and transmission of the one or more camera feeds to one or more mobile viewer devices 115. Similarly, the mobile viewer devices 115 may include an internet/network communication module 145 capable at least of receipt of one or more camera feeds from one or more virtual seat cameras 105 and/or from the stadium controller 150.

The communication module (not shown) of the virtual seat cameras 105, the internet/network communication module 155 of the stadium controller 150, and the internet/network communication module 145 of the mobile viewer device 115 may each be capable of receiving and transmitting a variety of types of data in addition to those discussed above, and may each be capable of wired data communication and/or wireless data communication. In particular, the communication modules discussed may include wired connectivity functionality, such as a Universal Serial Bus (USB) port, a FireWire port, an Ethernet port, a modem port, a fiber optic cable port, a Lightning port, a Thunderbolt port, customized audio jack port, or a proprietary data transfer cable port. The communication modules discussed may also include wireless connectivity functionality such as a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance power transmitter, an electromagnetic transmission module, a visible light communication (VLC) transmission module, a laser transmission module, an ultrasonic transmission module, an infrasonic transmission module, or some combination thereof.

The stadium transmitter 150 itself may be a computer system 1000, or a system with at least a subset of components that might be found in a computer system 1000. For example, the stadium transmitter 150 may include a processor 180, which may be any kind of processor 1010. The stadium transmitter 150 may include a memory 185, which may be any kind of memory 1020, mass storage 1030, portable storage 1040, or some combination thereof. The memory 185 may store, and the processor 180 may execute, a variety of software instructions.

The memory 185 of the stadium controller 150 may store several data structures. For example, the memory 185 may store a camera database 160, which may store virtual seat camera unique identifiers (e.g., serial numbers, barcodes, Quick Response "QR" codes, or alphanumeric codes) identifying various individual virtual seat cameras 105 for the purpose of linking selected virtual seat cameras 105 with authorized mobile viewer devices 115. The memory 185 may also store a user account database 175, which may store user account information for user accounts tied to individual mobile viewer devices 115, for the purpose of linking selected virtual seat cameras 105 with authorized mobile viewer devices 115. Though the camera database 160 and user account database 175 are described as databases, they may alternately take the form of other data structures capable of maintaining multiple entries, such as tables, lists, arrays, arraylists, hashes, dictionaries, trees, or some combination thereof.

Figure 5:
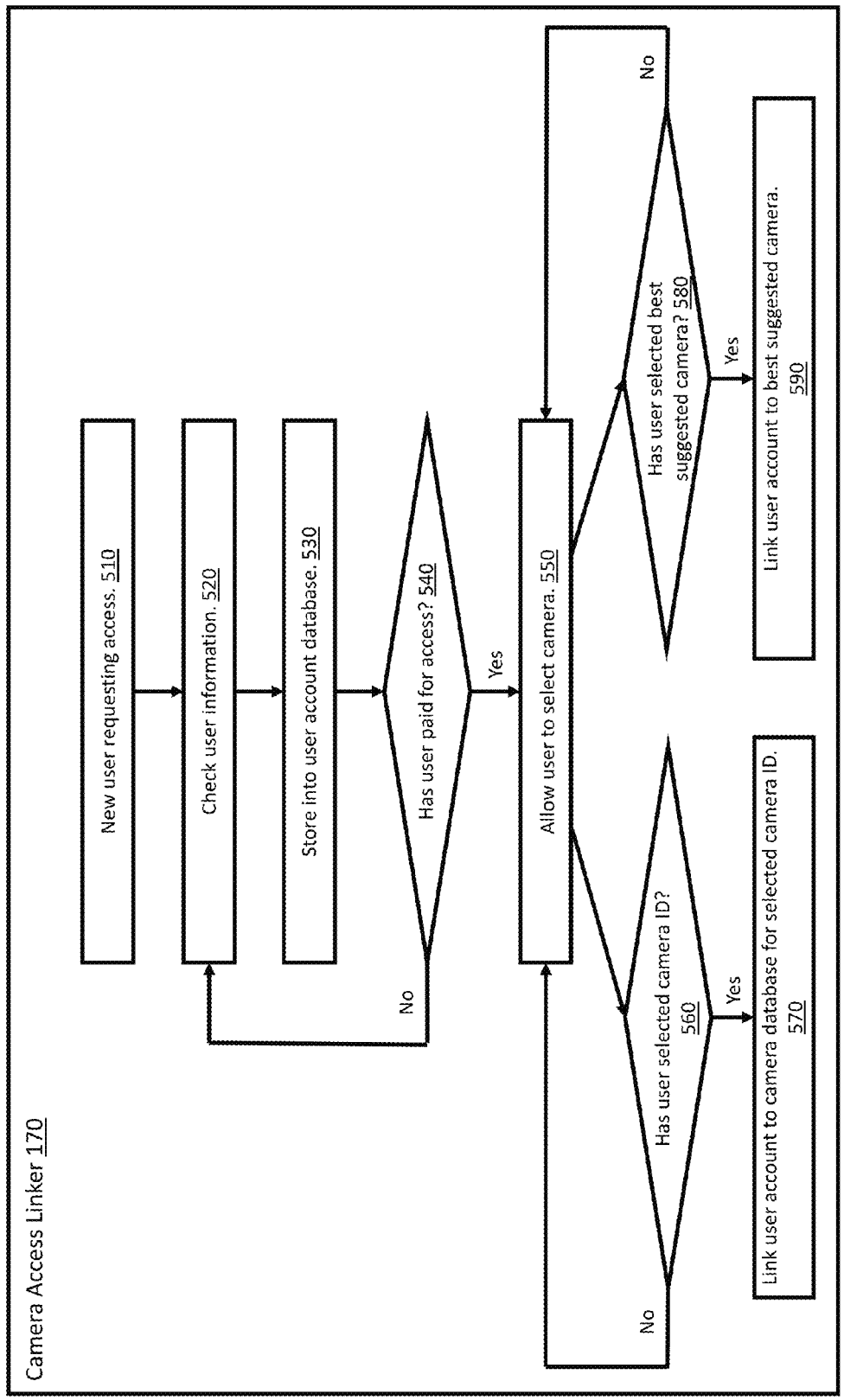
FIG. 5 is a flow chart illustrating exemplary operations by a camera access linker.

The stadium controller 150 may also include a camera access linker 170, which may be a hardware module, a software module, or some combination thereof, and may use data from the camera database 160 and the user account database 175 to determine which user accounts and/or which mobile viewer devices 115 should be granted access to which virtual seat cameras 105. The user account database 175 may include payment information, for example, so that the camera access linker 170 may determine if the user account associated with a particular mobile viewer device 115 has paid for the privilege of using one or more camera feeds from one or more virtual seat cameras 105. The user account database 175 may also include ticket information, which may be useful in situations where only eventgoers 190 and their associated user accounts and/or mobile viewer devices 115 may be granted access to one or more camera feeds from one or more virtual seat cameras 105. Example operations of the camera access linker 170 are illustrated in FIG. 5.

Figure 8:
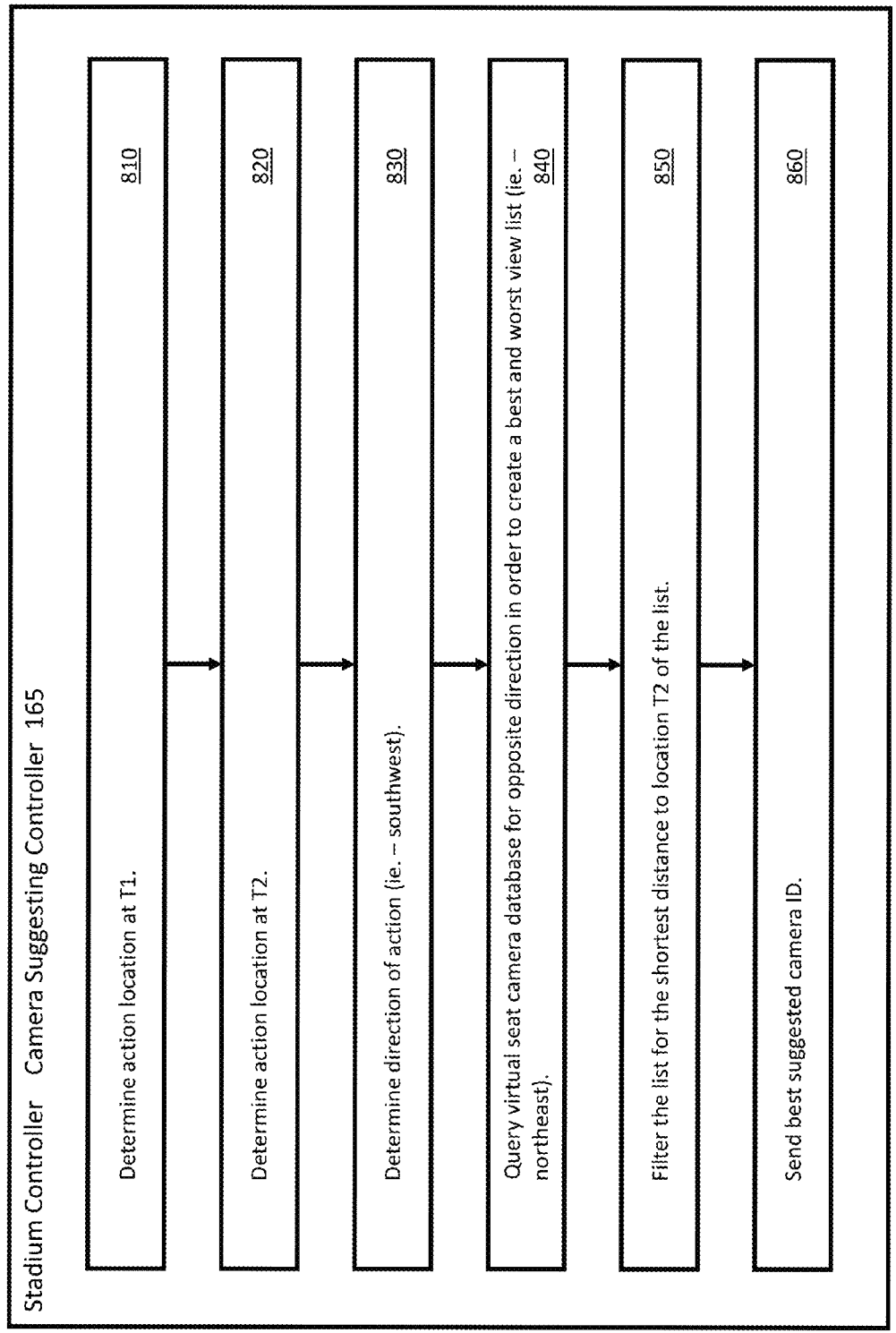
FIG. 8 is a flow chart illustrating exemplary operations by a stadium controller camera suggesting controller.

The stadium controller 150 may also include a camera suggesting controller 165, which may be a hardware module, a software module, or some combination thereof, and may use data from the camera database 160 (e.g., locations of individual virtual seat cameras 105 and directions that individual virtual seat cameras 105 are pointing in) and from the camera feeds of the virtual seat cameras 105 themselves to determine a predetermined number of "best" and "worst" virtual seat cameras feeds for viewing a particular event occurrence (e.g., a goal or basket or touchdown is scored, a pass is caught, a foul is called, a performing artist plays a popular song or performs a popular dance move). The "best" camera feeds may be, for example, the camera feeds from the virtual seat cameras 105 that are closest to a particular event occurrence, or that view it from a particular angle (e.g., from a front side, perpendicular, or from behind), or that have the clearest view (e.g., the highest-resolution view, the best-focused view, the least obstructed view, the least foggy/dusty/blurry view, the least warped/damaged lens, the most color-accurate view, the view from the best quality camera) or some combination thereof. Example operations of the camera suggesting controller 165 are illustrated in FIG. 8.

The mobile viewer device 115 may be any type of computing system 900, and may be, for example, a smartphone, a laptop, a portable media player device, a portable video game console, or a portable e-book reader device. The mobile viewer device 115 may include a memory (not shown) (which may be any type of memory 1020, mass storage 1030, portable storage 1040, or some combination thereof) and a processor (not shown) (which may be any type of processor 1010), as well as a global positioning system (GPS) communication module 140 and the network/internet communication module 140 described above. The GPS communication module 140 may allow the mobile viewer device 115 to communicate with one or more GPS satellites to determine the geographic location of the mobile viewer device 115, generally within a predetermined threshold margin of error. The memory of the mobile viewer device 115 may store, and the processor of the mobile viewer device 115 may execute, a virtual seat viewer application 120, which may include a virtual seat viewer graphical user interface (GUI) 125 (e.g., see the exemplary virtual seat viewer GUI 125 of FIG. 3) to allow interaction with a user of the mobile viewer device 115, and virtual seat viewer software functions 130 (e.g., see the exemplary virtual seat software 130 operations of FIG. 4) to perform camera feed streaming functions. Numerous mobile viewer devices 115 may exist both within the event venue 100 and outside of the event venue 100, as identified by "mobile viewer device N 135."

FIG. 2A illustrates an exemplary virtual seat camera coupled to a beam.

In particular, FIG. 2A illustrates a stadium beam 205 (or event venue beam 205 in a non-stadium event venue 100) between two stadium seats 210 (or event venue seats 210 in a non-stadium event venue 100), where a virtual seat camera 105 is affixed to the support beam 105 to point toward a performance area (e.g., facing a sport field of play or concert stage, or facing the same direction the stadium seats 210 are facing). The stadium beam 205 may be an existing support beam or divider beam, or may be a beam placed between the seats solely for the purpose of attaching the virtual seat camera 105.

FIG. 2B illustrates an exemplary virtual seat camera coupled to a seat.

In particular, FIG. 2A illustrates a stadium seat 210 (or an event venue seat 210 in a non-stadium event venue 100) with an attachment mechanism, such as an attachment post, to which the virtual seat camera 105 is affixed. The virtual seat camera 105 can alternately be embedded into the stadium seat 210 (e.g., into the front of an armrest of the stadium seat 210) or affixed to another part of the stadium seat 210, such as underneath or in front of an armrest of the stadium seat 210, underneath the stadium seat 210, or somewhere else where the view might not be obstructed by a person sitting in the stadium seat 210. The virtual seat camera 105 may even occupy a stadium seat 210 if the stadium seat 210 is not going to be occupied by a person (e.g., certain seats in the event venue 100 may be marked as "camera seats" to be occupied by a virtual seat camera 105 rather than a person).

Figure 2C:
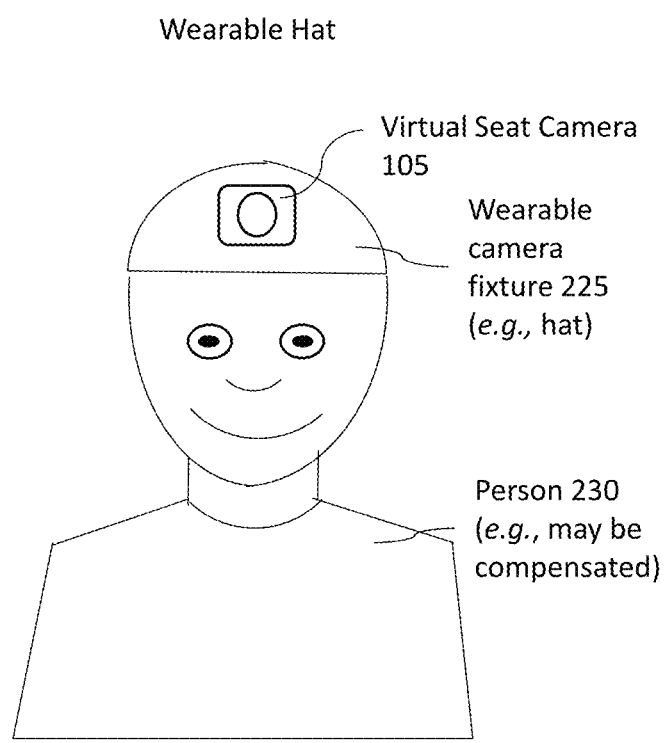
FIG. 2C illustrates an exemplary virtual seat camera coupled to a wearable camera fixture worn by a person.

FIG. 2C illustrates an exemplary virtual seat camera coupled to a wearable camera fixture worn by a person.

In particular, the virtual seat camera 105 of FIG. 2C is affixed to a wearable camera fixture 225, namely, a hat, which is worn by a person 230. The person may then sit in a stadium seat 210 (or an event venue seat 210 in a non-stadium event venue 100) and watch an event held at the event venue 100. The person 230 may also stand next to an event venue seat 210 or in an area where there are no seats but where the view is useful. The person 230 may be compensated for wearing the virtual seat camera 105 (e.g., the person 230 may be an employee, a contractor, or a regular person) via payment or receipt of discounts or promotions at event venue concession stands.

While the wearable camera fixture 225 of FIG. 2C is depicted as a hat, it may be any other type of clothing article or jewelry article that could support a camera and an associated communication module as described in FIG. 1. For example, the wearable camera fixture 225 may be a necklace, a scarf, a shoulder pad, a jacket, a shirt, a bracelet, a watch, a headband, a pair of "smart" glasses or goggles, or another similar device.

Figure 3:
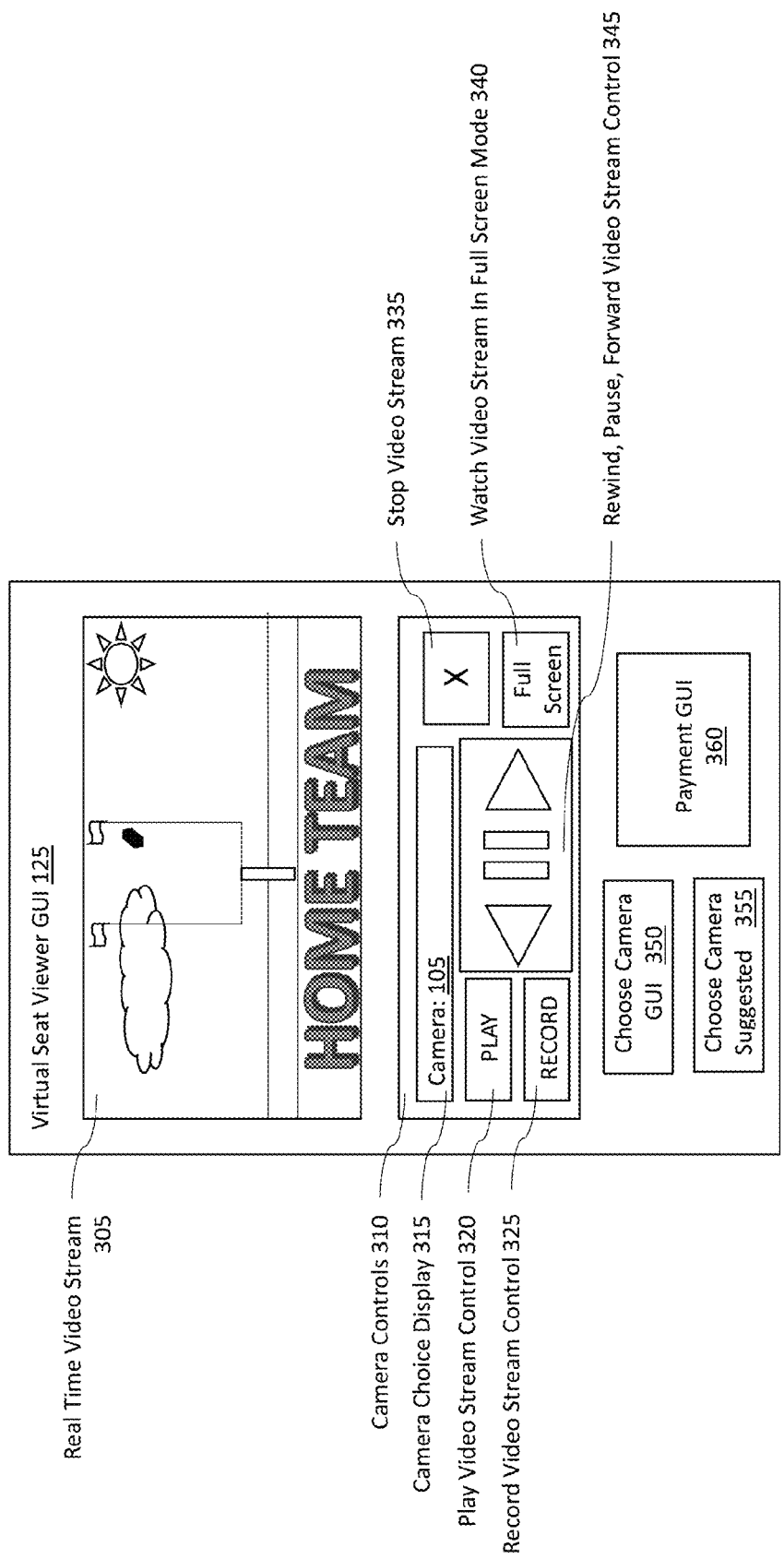
FIG. 3 illustrates an exemplary virtual seat viewer graphical user interface.

FIG. 3 illustrates an exemplary virtual seat viewer graphical user interface.

The virtual seat viewer GUI 125 of FIG. 3 includes a real-time video stream 305, which comes from one or more camera feeds from one or more virtual seat cameras 105 (e.g., the real-time video stream 305 may in some cases switch from one camera feed from one virtual seat camera 105 to another camera feed from another virtual seat camera 105 based on which camera feed best shows particular event occurrences).

The virtual seat viewer GUI 125 of FIG. 3 also includes camera controls 310, which may include various GUI elements for controlling the virtual seat camera 105 being viewed or how the camera feed shown in the real-time video stream 305 is to be shown. For example, the camera controls 310 illustrated in FIG. 3 include a camera choice display 315, which identifies a particular virtual seat camera 105 whose camera feed is currently being displayed through the real-time video stream 305 (e.g., using a unique alphanumeric identifier associated with the particular virtual seat camera 105), and that may also allow a user of the virtual seat viewer GUI 125 to input a different alphanumeric identifier associated with a different virtual seat camera 105 in order to see a view from the different virtual seat camera 105.

The camera controls 310 illustrated in FIG. 3 also include a video stream control "play" button 320 that enables viewing of the real-time video stream 305, a video stream control "stop" button 335 that stops viewing of the real-time video stream 305, and video stream controls for "pause," "rewind," and "fast-forward" functions 345, allowing the real-time video stream 305 to be paused, rewinded, and fast-forwarded when applicable respectively. The camera controls 310 illustrated in FIG. 3 also include a video stream control "record" button 325 that enables recording of the real-time video stream 305, the recorded video to be stored into a memory accessible by the mobile viewer device 115 (e.g., either a local memory of the mobile viewer device 115, the local memory 185 of the stadium controller 150, or a distributed cloud/internet-based data storage solution). The camera controls 310 illustrated in FIG. 3 also include a video stream control "full screen" button 340 that hides the remainder of the virtual seat viewer GUI 125 so that the real-time video stream 305 can occupy all or nearly all of the display of the mobile viewer device 115.

The virtual seat viewer GUI 125 may also have a "choose camera GUI" GUI element 350 which may allow a user of the virtual seat viewer GUI 125 to manually select a different virtual seat camera 105 to receive a camera feed from and play in the real-time video stream 305. In some cases, virtual seat cameras 105 may be excluded from selection whose camera feeds do not have a view of the event or of a particular event occurrence. The virtual seat viewer GUI 125 may also have a "choose camera suggested" GUI element 355 which may recommend or automatically select one or more "best" camera feeds from one or more virtual seat cameras 105 to receive a camera feed from and play in the real-time video stream 305. The virtual seat viewer GUI 125 may also have a "payment GUI" GUI element 360 which may allow a user of the virtual seat viewer GUI 125 to pay for use of different functions of the real-time video stream 305 (e.g., to pay to use the real-time video stream 305 at all, to pay for each different camera feed from each different virtual seat camera 105, to pay for functions such as "record" 325, or to pay for recommendations from the "choose camera suggested" feature 355).

Figure 4:
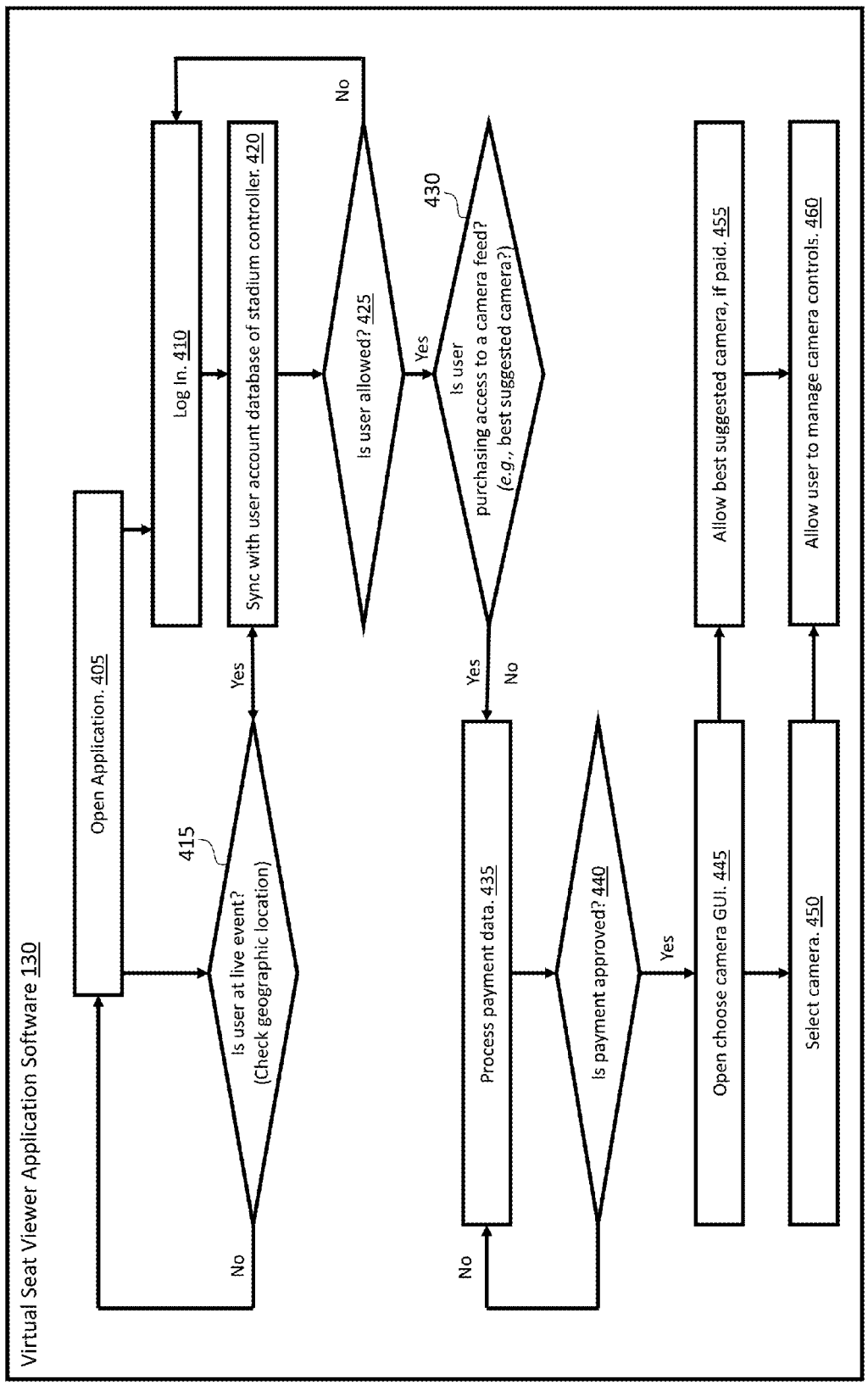
FIG. 4 is a flow chart illustrating exemplary operations by a virtual seat viewer application software.

FIG. 4 is a flow chart illustrating exemplary operations by a virtual seat viewer application software.

The exemplary operations of the viewer application software 130 illustrated in FIG. 4 begin at step 405, where a user opens the viewer application 120 on a mobile viewer device 115. If the user is not already logged in, step 410 identifies that the user may log in to a user account via the viewer application 120, after which, at step 420, the user's account information may be synchronized between the mobile viewer device 115 and the user account database 175 of the stadium controller 150 (e.g., via a connection between comm 145 and comm 155).

In some cases, the viewer application 120 may restrict access to camera feeds only to eventgoers (e.g., to encourage people to attend events). In such cases, the viewer application software 130 may, at step 415, determine whether the user is at the relevant event by determining whether the geographic location, as reported by the GPS communication module 140 of the mobile viewer device 115, is reported as being within the event venue 100. Step 415 may come after step 405, step 410, or step 420. If the user (and the mobile viewer device 115) is determined to be not present at the event, the user may be denied access to camera feeds, after which the viewer application software 130 may revert to step 405. If the user (and the mobile viewer device 115) is determined to be present at the event, the viewer application software 130 may step forward to step 420.

At step 425, the viewer application software 130 may check to determine whether the user's user account is allowed to use the viewer application 120 and in particular the real-time video stream 305 (e.g., if the user has paid to be able to use these functions). If the user is not allowed at step 420, the viewer application software 130 may revert back to step 410, so that the user may log in with a different user account, or may allow the user to pay for a camera feed at step 430. If the user is allowed at step 420, the viewer application software 130 may determined if the user is purchasing access to a camera feed for use as a real-time video stream 305 (e.g., a camera feed from a manually selected camera or from a best suggested camera). In some cases, virtual seat cameras 105 may be excluded from manual selection whose camera feeds do not have a view of the event or of a particular event occurrence At step 435, the viewer application software 130 may process payment data, which may be approved at step 440. If the payment data is not approved at step 440, the viewer application software 130 may revert back to processing the payment data at step 435. Otherwise, the viewer application software 130 may continue to step 445.

At step 445, the user may open the choose camera GUI 350, wherein the user may choose a camera feed from one or more virtual seat cameras 105. If the user has paid for a "best suggested camera" recommendation function, this may then be provided at step 455, after which the user may, at step 460, receive the video feed at the real-time video stream 305 and be allowed to control the playback via the camera controls 310 of the virtual seat viewer GUI 125. If the user has not paid for the "best suggested camera" recommendation function, the viewer application software 130 may instead, at step 450, allow the user to manually select a camera feed from one or more virtual seat cameras 105, after which the user may, at step 460, receive the video feed at the real-time video stream 305 and be allowed to control the playback via the camera controls 310 of the virtual seat viewer GUI 125. In some cases, virtual seat cameras 105 may be excluded from selection whose camera feeds do not have a view of the event or of a particular event occurrence FIG. 5 is a flow chart illustrating exemplary operations by a camera access linker.

The exemplary operations of the camera access linker 170 illustrated in FIG. 5 begin at step 510, where a new user (e.g., a user account, which may be associated with a particular mobile viewer device 115, that has not yet been linked to a particular camera feed from a particular virtual seat camera 105) requests access to a camera feed from a particular virtual seat camera 105. At step 520, the camera access linker 170 checks user information about the user account (e.g., from the mobile viewer device 115, from the user account database 175, and from other sources such as payment service systems) and, at step 530, stores any new information obtained about the user in the user account database 175.

At step 540, the camera access linker 170 then determines whether the user has paid to access the camera feed. If not, the camera access linker 170 returns to step 520, but if so, the camera access linker 170 proceeds to step 550, where it allows the user to select a camera feed from various camera feeds from various virtual seat cameras 105.

If, at step 560, the user has manually selected a camera feed, then at step 570, the user's user account may be linked to an entry in the camera database 160 associated with the selected virtual seat camera 105. If, at step 580, the user has selected a best suggested camera feed (e.g., that has been suggested by the camera suggesting controller 165), then at step 590, the user's user account may be linked to an entry in the camera database 160 associated with the selected virtual seat camera 105.

Figure 6:
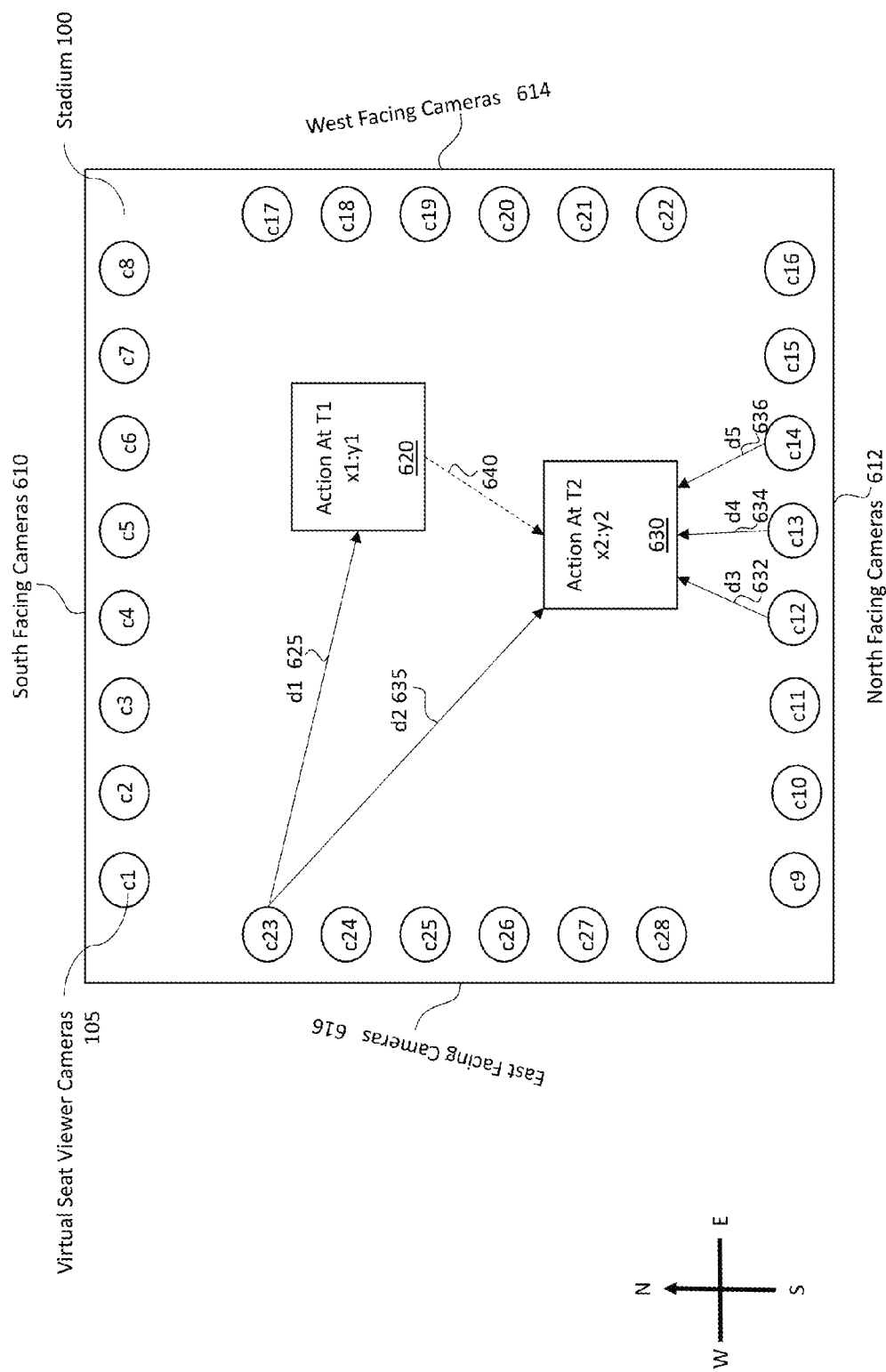
FIG. 6 illustrates exemplary event occurrences captured by multiple exemplary virtual seat cameras.

FIG. 6 illustrates exemplary event occurrences captured by multiple exemplary virtual seat cameras.

In particular, FIG. 6 illustrates a square depiction of an event venue 100. In particular, the event venue 100 includes 23 virtual seat camera 105, all identified with encircled integers numbering c1-c23. These include south-facing cameras 610, identified as cameras c1-c8, north-facing cameras 612, identified as cameras c9-c16, west-facing cameras 614, identified as cameras c17-c22, and east-facing cameras 616, identified as cameras c23-c28.

FIG. 6 identifies a first event occurrence 620 at a time identified as T1 at a location identified by coordinates x1 and y1. FIG. 6 also identifies a second event occurrence 630 at a time identified as T2 at a location identified by coordinates x2 and y2.

FIG. 6 identifies various viewpoints from various camera angles, each viewpoint a particular distance from the first event occurrence 620 and/or the second event occurrence 630. For example, east-facing camera c23 is a distance d1 625 away from the first event occurrence 620, and a second distance d2 635 away from the second event occurrence 630. North-facing camera c12 is identified as a distance d3 632 away from the second event occurrence 630. North-facing camera c13 is identified as a distance d4 634 away from the second event occurrence 630. North-facing camera c14 is identified as a distance d5 636 away from the second event occurrence 630.

Because distance d4 634 appears to be the shortest distance away from the second event occurrence 630 compared to any other camera in the event venue 100, the camera feed from camera c13 could be identified as the "best" camera feed for viewing the second event occurrence 630.

If, for example, the first event occurrence 620 is a pass and the second event occurrence 630 is a catch, it may be identified that an action is being taken in a southwestern direction along arrow 640. In such a case, a substantially perpendicular view of the action along arrow 640, such as a southwest-facing view from camera c23, or a northeast-facing view from cameras c16 or c22, may be identified as the "best" camera. Alternately, a camera substantially along the action line 640 may be determined to be the "best" camera, such as a northwest-facing view from camera c10 or c11 or c12, or to a lesser extent (e.g., since the action is moving away from the southern-facing cameras 610) a southeast-facing camera such as camera c8.

FIG. 7 illustrates an exemplary stadium controller camera database.

The camera database 160 of FIG. 7 includes an identifier column 710, which identifies a particular virtual seat cameras 105 by a unique alphanumeric camera identifier associated with each virtual seat camera 105 (e.g., c1, c2, c3, . . . c28). The camera database 160 of FIG. 7 also includes a "facing" column 720, which identifies a direction that the virtual seat cameras 105 identified in column 710 are facing (e.g., south as with cameras 610, north as with cameras 612, west as with cameras 614, east as with cameras 616, or a combined direction). The camera database 160 of FIG. 7 also includes a "coordinates" column 720, which identifies a coordinate-based geographical location for each of the virtual seat cameras 105 identified in column 710, which may be determined by a global positioning system (GPS) or may be relative positions determined locally using a coordinate system based on the seating arrangement in the event venue 100. Other data may also be stored in the camera database 160, such as which user accounts and/or mobile viewer devices 115 may access each virtual seat camera 105 identified in column 710.

FIG. 8 is a flow chart illustrating exemplary operations by a stadium controller camera suggesting controller.

The exemplary operations of the camera suggesting controller 165 illustrated in FIG. 8 begin at step 810, where an action location is determined at time T1 (e.g., the first event occurrence 620 of FIG. 6, which is determined to be at location x1:y1). Location determination can use thermal vision (e.g., detecting heat signatures of players), computer vision techniques (e.g., edge detection to determine the locations of players and balls/pucks), locator devices coupled to players and balls/pucks (e.g., players may wear GPS locators, balls/pucks may include embedded GPS locators), motion detection (e.g., detecting motion of players and of balls/pucks), or some combination thereof. At step 820, an action location is similarly determined at time T2 (e.g., the second event occurrence 630 of FIG. 6, which is determined to be at location x2:y2).

Once the two action locations are determined at steps 810 and 820, at step 830 the camera suggesting controller 165 may determine a direction of an action spanning time T1 and T2 and the two action locations. For example, if the first event occurrence 620 and second event occurrence 630 of FIG. 6 are used as examples, the direction of action is shown in line 640, which points in a southwestern direction. Once the action direction is determined in step 830, the camera suggesting controller 165 may query the camera database 160 to determine the "best" and "worst" cameras based on the viewing angles of the cameras, on the distances from the cameras to the first event occurrence 620 and second event occurrence 630, and based on the type of action performed across the action direction 640. For example, if the action performed across the action direction 640 is a pass of a ball, the "best" camera view may be one that provides a head-on view of the pass from a north-eastern facing camera such as cameras c10, c11, or c12.

In step 850, the "best" camera angles may be filtered based on the shortest distance, which, of cameras c10, c11, or c12, would suggest that the "best" camera would be camera c12. Other filters may also be taken into account, such as which camera has the clearest or best-quality image, which camera's feed is least shaky, which has the least noise, which camera films in color versus greyscale, which camera provides video footage rather than a sequence of still images, or other considerations. In step 860, the camera suggesting controller 165 may output the "best" suggested camera identifier, which in this case may be camera c12 as described above.

Figure 9:
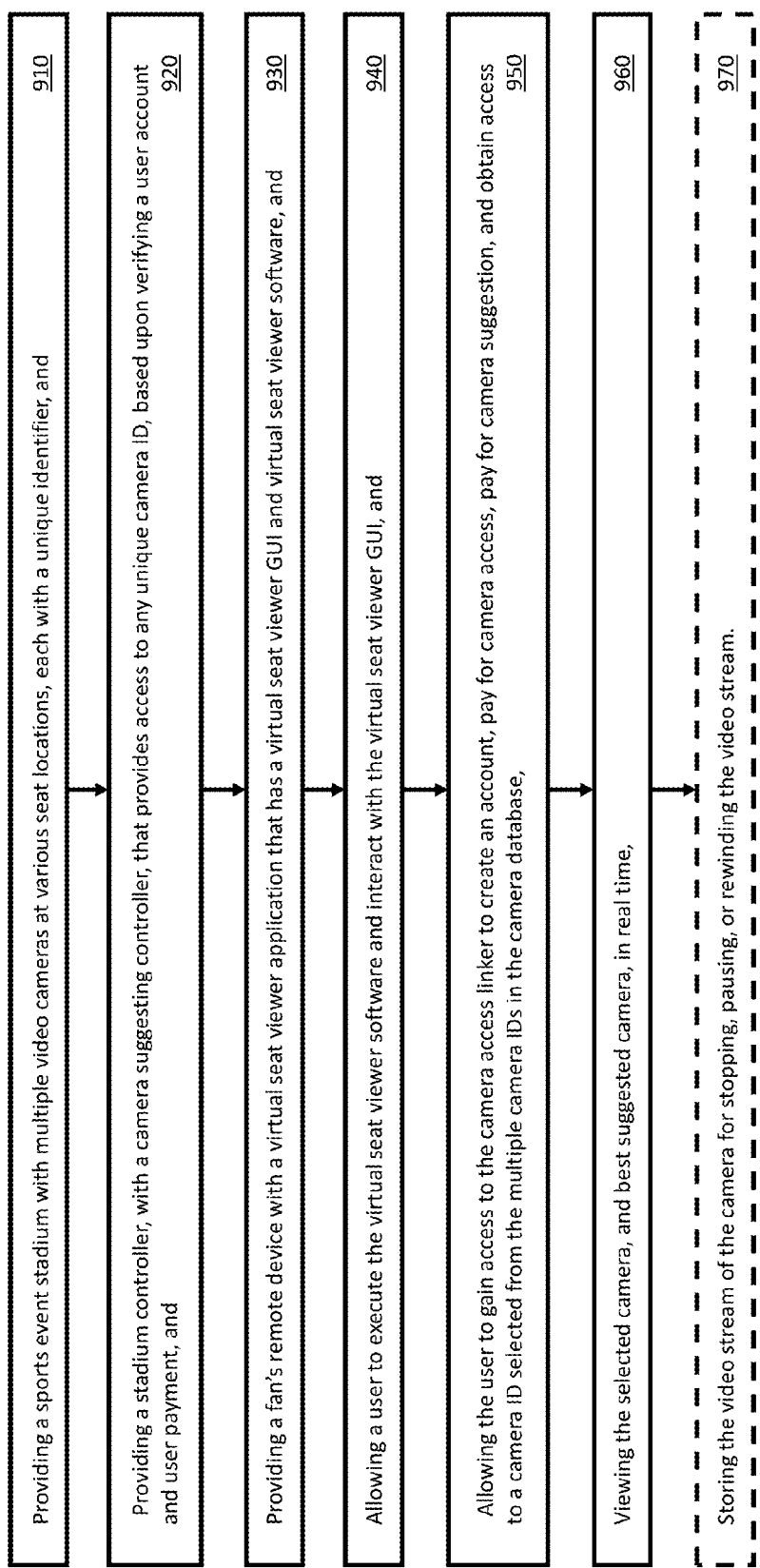
FIG. 9 illustrates an exemplary overall method of the present invention as described herein.

FIG. 9 illustrates an exemplary overall method of the present invention as described herein.

The method, at step 910, includes providing a sports event stadium 100 (or other event venue 100) with multiple video cameras at various seat locations, each video camera with a unique camera identifier (ID).

The method, at step 920, includes providing a stadium controller 150 hat provides access to any unique camera ID, based upon verifying a user account and user payment.

The method, at step 930, includes providing a fan's mobile viewer device 115 with a virtual seat viewer application 120 that has a virtual seat viewer GUI 125 and virtual seat viewer software 130.

The method, at step 940, includes allowing a user to execute the virtual seat viewer software 130 and interact with the virtual seat viewer GUI 125 using the user's mobile viewer device 115.

The method, at step 950, includes allowing the user to gain access to the camera access linker 170 to create an account, pay for camera access, and obtain access to a camera ID selected from the multiple camera IDs in the camera database 160.

The method, at step 960, includes viewing the selected camera in real time through a real-time video stream 305.

The method, at step 970, optionally includes storing at least part of the video stream of the camera for stopping, pausing, or rewinding the video stream.

Figure 10:
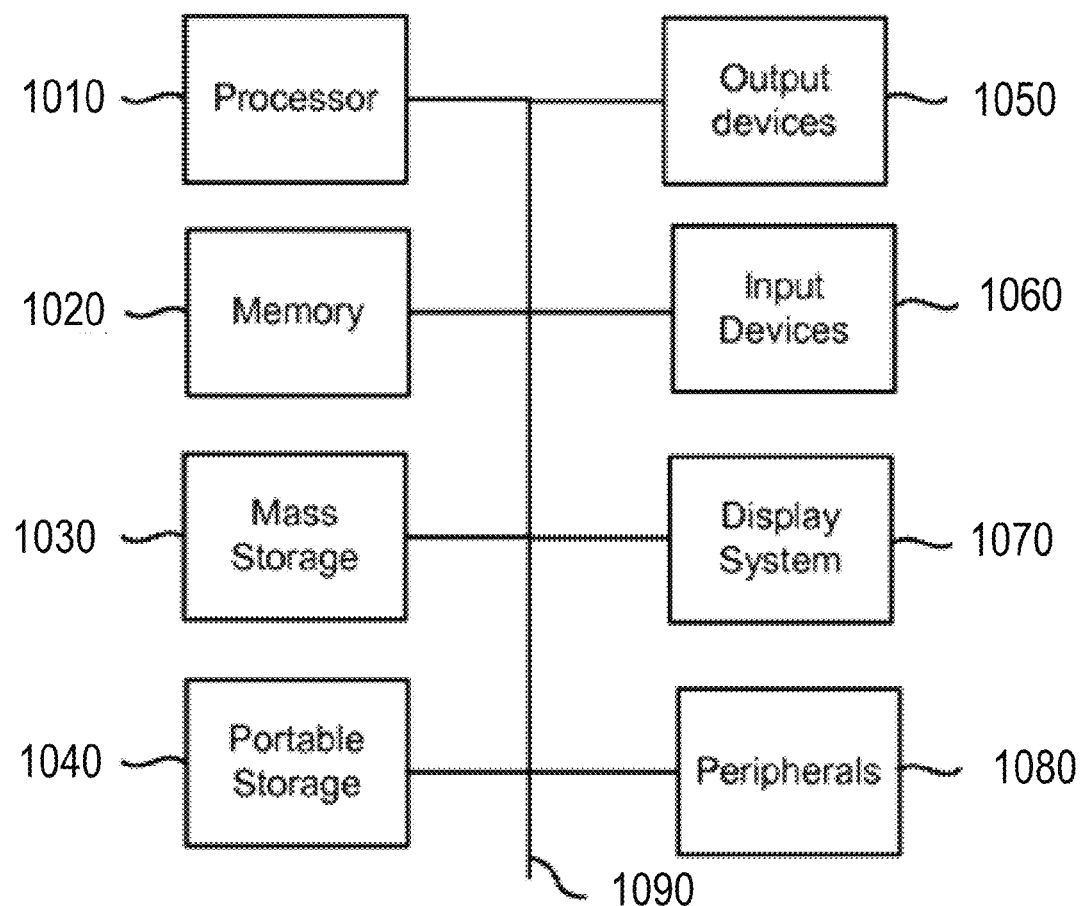
FIG. 10 is a block diagram of an exemplary computing device that may be used to implement an embodiment of the present invention.

FIG. 10 illustrates an exemplary computing system 1000 that may be used to implement an embodiment of the present invention. The computing system 1000 of FIG. 10 includes one or more processors 1010 and memory 1010. Main memory 1010 stores, in part, instructions and data for execution by processor 1010. Main memory 1010 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1010 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1010.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for event camera feed distribution, the method comprising:
receiving a plurality of camera feeds associated with a plurality of cameras located in an eventgoer area of an event venue, wherein each camera feed of the plurality of camera feeds is associated with one camera of the plurality of cameras, and wherein each camera of the plurality of cameras is coupled to a seating element assigned to a different location within the eventgoer area and a corresponding camera feed of the plurality of camera feeds simulates a view from the seating element;
receiving a request from a mobile device to view an event taking place in the event venue;
identifying a first location of a first event occurrence taking place at a first time during the event;
identifying a second location of a second event occurrence taking place at a second time during the event;
determining a first set of distances from each of the plurality of cameras to the first location;
determining a second set of distances from each of the plurality of cameras to the second location;
generating a camera feed listing of the plurality of camera feeds, wherein the camera feed listing indicates a quality level of each of the camera feeds based on the first set of distances and the second set of distances;
transmitting the camera feed listing to the mobile device, wherein the camera feed listing identifies at least a subset of the plurality of camera feeds;
receiving a selection from the mobile device, wherein the selection identifies a first camera feed from the camera feed listing; and
streaming video data from the first camera feed to a video playing interface stored in a memory of the mobile device and executed by a processor of the mobile device.

2. The method of claim 1, wherein the camera feed listing identifies the plurality of camera feeds.

3. The method of claim 1, wherein the camera feed listing identifies a set of one or more acceptable camera feeds of the plurality of camera feeds, wherein the set of one or more acceptable camera feeds include an unobstructed view of the event.

4. The method of claim 1, wherein the one or more best camera feeds are determined based at least partially on a direction of action between the first location and the second location.

5. The method of claim 1, wherein the one or more best camera feeds are determined based at least partially on recognizing a first type of occurrence of the first event occurrence and on recognizing a second type of occurrence of the second event occurrence.

6. The method of claim 1, wherein the plurality of cameras face a plurality of directions, and wherein the one or more best camera feeds are determined based at least partially on the directions faced by the cameras of the plurality of cameras.

7. The method of claim 1, further comprising identifying that the mobile device is located within the event venue.

8. The method of claim 1, further comprising processing a payment from the mobile device in exchange for access to the first camera feed.

9. The method of claim 1, further comprising processing a payment from the mobile device in exchange for the transmission of the camera feed listing.

10. A system for event camera feed distribution, the system comprising:
a plurality of cameras located in an eventgoer area of an event venue, wherein each camera of the plurality of cameras is coupled to a seating element within the eventgoer area;
an event venue controller, wherein execution of instructions stored in a memory of the event venue controller by a processor of the event venue controller:
receives a plurality of camera feeds associated with the plurality of cameras, wherein each camera feed of the plurality of camera feeds is associated with one camera of the plurality of cameras, and wherein each camera of the plurality of cameras is coupled to a seating element assigned to a different location within the eventgoer area and a corresponding camera feed of the plurality of camera feeds simulates a view from the seating element,
receives a request from a mobile device to view an event taking place in the event venue,
identifies a first location of a first event occurrence taking place at a first time during the event,
identifies a second location of a second event occurrence taking place at a second time during the event,
determines a first set of distances from each of the plurality of cameras to the first location,
determines a second set of distances from each of the plurality of cameras to the second location,
generates a camera feed listing of the plurality of camera feeds, wherein the camera feed listing indicates a quality level of each of the camera feeds based on the first set of distances and the second set of distances,
transmits the camera feed listing to the mobile device, wherein the camera feed listing identifies at least a subset of the plurality of camera feeds,
receives a selection from the mobile device, wherein the selection identifies a first camera feed from the camera feed listing, and
streams video data from the first camera feed to a video playing interface stored in a memory of the mobile device and executed by a processor of the mobile device.

11. The system of claim 10, wherein the camera feed listing identifies the plurality of camera feeds.

12. The system of claim 10, wherein the camera feed listing identifies a set of one or more acceptable camera feeds of the plurality of camera feeds, wherein the set of one or more acceptable camera feeds include an unobstructed view of the event.

13. The system of claim 10, wherein the one or more best camera feeds are determined based at least partially on a direction of action between the first location and the second location.

14. The system of claim 10, wherein the one or more best camera feeds are determined based at least partially on recognizing a first type of occurrence of the first event occurrence and on recognizing a second type of occurrence of the second event occurrence.

15. The system of claim 10, wherein the plurality of cameras face a plurality of directions, and wherein the one or more best camera feeds are determined based at least partially on the directions faced by the cameras of the plurality of cameras.

16. The system of claim 10, further comprising identifying that the mobile device is located within the event venue.

17. The system of claim 10, further comprising processing a payment from the mobile device in exchange for access to the first camera feed.

18. A non-transitory computer-readable storage medium, having embodied thereon a program executable by a processor to perform a method for camera feed distribution, the method comprising:

receiving a plurality of camera feeds associated with a plurality of cameras located in an eventgoer area of an event venue, wherein each camera feed of the plurality of camera feeds is associated with one camera of the plurality of cameras, and wherein each camera of the plurality of cameras is coupled to a seating element assigned to a different location within the eventgoer area and a corresponding camera feed of the plurality of camera feeds simulates a view from the seating element;

receiving a request from a mobile device to view an event taking place in the event venue;

identifying a first location of a first event occurrence taking place at a first time during the event;

identifying a second location of a second event occurrence taking place at a second time during the event;

determining a first set of distances from each of the plurality of cameras to the first location;

determining a second set of distances from each of the plurality of cameras to the second location;

generating a camera feed listing of the plurality of camera feeds, wherein the camera feed listing indicates a quality of each of the camera feeds based on the first set of distances and the second set of distances;

transmitting the camera feed listing to the mobile device, wherein the camera feed listing identifies at least a subset of the plurality of camera feeds;

receiving a selection from the mobile device, wherein the selection identifies a first camera feed from the camera feed listing; and streaming video data from the first camera feed to a video playing interface stored in a memory of the mobile device and executed by a processor of the mobile device.

* * * * *